(No Model.)
T. O. PERRY.
GRAIN HARVESTER.
No. 355,660. Patented Jan. 4, 1887.
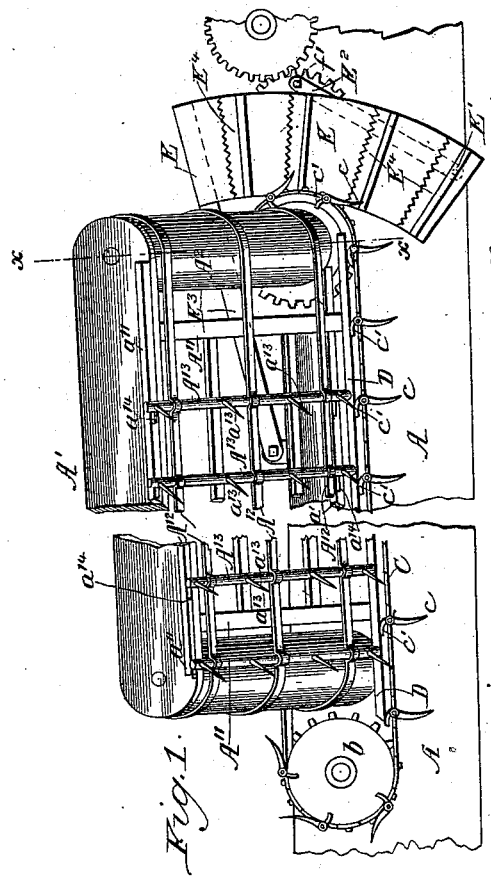
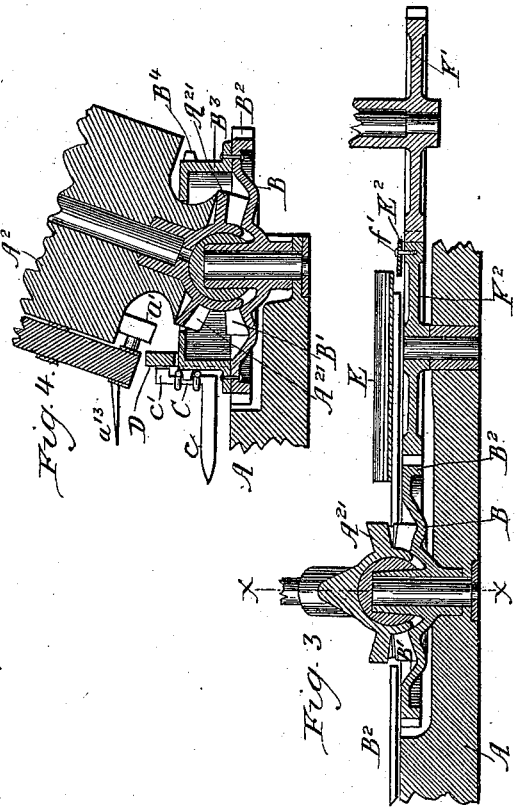
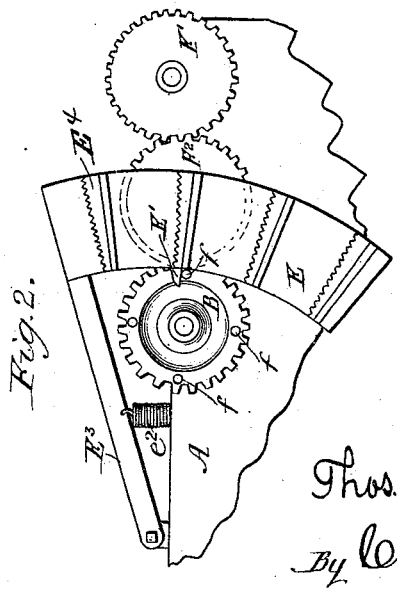
Witnesses:
Frank J. Blanchard
J. P. Ellacott
Inventor:
Thos. O. Perry
By Chas. S. Burton
his Attorney.

UNITED STATES PATENT OFFICE.

THOMAS O. PERRY, OF CHICAGO, ILLINOIS, ASSIGNOR TO LAVERNE W. NOYES, OF SAME PLACE.

GRAIN-HARVESTER.

SPECIFICATION forming part of Letters Patent No. 355,660, dated January 4, 1887.

Application filed September 30, 1885. Serial No. 178,622. (No model.)

*To all whom it may concern:*

Be it known that I, THOMAS O. PERRY, a citizen of the United States, and residing at Chicago, in the county of Cook and State of Illinois, have invented certain new and useful Improvements in Grain-Harvesters, which are fully set forth in the following specification.

This invention pertains to self-binding grain-harvesters in which the grain is carried on end into the binder, not being allowed to fall prostrate after it is severed by the cutting mechanism.

It relates, in particular, to devices for engaging the grain at the butts and carrying it around the delivery end of the standing endless conveyer, thus keeping it upright until it is seized by the packers.

It consists of two parts—viz., first, an endless toothed chain carried by a horizontal sprocket-wheel located at the base of the conveyer and having its carrying-teeth protruding horizontally into the grain, which stands on the grain-supporting ledge in front of the conveyer, and engaging the grain near the butts; second, a reciprocating plate at or near the level of the grain-supporting ledge at its stubble end, having ratchet-like teeth or ribs on its upper surface and reciprocating from front to rear across the stubble end of the ledge at the delivery end of the conveyer, and thereby carrying the grain standing upright on it into the binder rearward.

In the drawings, Figure 1 is a plan, Fig. 2 a detail plan, of a modified form of butt-carrier. Fig. 3 is a vertical section through the actuating gear-train. Fig. 4 is a vertical section through the line $x$ $x$, Figs. 1 and 3.

A is the grain-supporting ledge, being a plank which supports the conveyer and butt-carrier, hereinafter described.

A' is the conveyer, sustained upon the ledge A, and comprising the frame $A^{11}$, the endless conveyer belts or chains $A^{12}$, which are united by the cross-bars $A^{13}$, which are pivoted to the chains and have the grain-carrying teeth $a^{13}$, and are provided at the ends with the tails $a^{14}$, which travel on the bars $a^{11}$ of the frame $A^{11}$, and hold the cross-bars in position, with their teeth protruding forward while the belts or chains travel stubbleward, and which run off said bars at the stubble end and allow the cross-bars to rock and tip the teeth $a^{13}$ backward, so that they may withdraw freely from the grain as the chains start back in their course at the rear.

$A^2$ is the roller which drives the endless conveyer belts or chains. It is carried by the bevel gear-wheel $A^{21}$, which meshes with and is driven by the horizontal beveled rim B' of the gear-wheel B, which derives motion from the main driving-gear rim on the drive-wheel, through a train concluding with the horizontal gear-wheels F' and $F^2$, the last of which meshes with the horizontal spur-rim $B^2$ of the gear-wheel B and drives said wheel. The said gear-wheel B has the web-extension $B^3$ springing from the principal web between the spur-rim $B^2$ and the beveled gear-rim B', and forming a flange encircling the latter rim and partly overhanging it, to exclude the straw, and provided exteriorly with the sprocket-rim $B^4$, which carries the endless toothed chain C, which extends the whole length of the conveyer, and at the grain end is guided around the pulley or sprocket wheel $b$, which has a suitable bearing on the ledge A at the grain end of the conveyer. Grain-carrying teeth $c$ are pivoted to the chain C, and are provided with tails $c'$, which, on the front side of the conveyer, travel against the board D, which is secured to the ledge A under the conveyer A', and thereby the teeth $c$ are kept protruded horizontally over the ledge A'. At the stubble end the tails $c'$ run off the board D, and while the chain C passes around the sprocket-wheel rim $B^4$ the tails $c'$ pass above it, and, being then free to yield to the grain, turn on their pivots and withdraw freely from the grain as the chain starts on its return course at the rear of the conveyer.

E is the butt-carrier. It consists of the horizontal plate lying over the gear $F^2$, about flush with the upper surface of the ledge A at the delivery end of the conveyer, being suitably sustained and guided to permit its being reciprocated horizontally across the path of the grain as it is delivered from the conveyer. It is preferably pivoted, as illustrated, to the plank A at a point some distance grainward from the end of the conveyer, and in the rear thereof; and for that purpose it is provided with the arm E³, extending from the rear inner corner to such pivot. It is thus adapted to vibrate in the arc of a circle across the path of the grain as it is delivered from the conveyer. It is most readily reciprocated by the link or pitman E², extended from the wrist-pin $f'$ on the upper face of the gear-wheel F² to the pivot $e$ on the under face of the plate E. I do not, however, confine myself to this particular mode of actuating it. The upper surface of the plate E is provided with ribs or lips E⁴, projecting, ratchet-like, toward the rear, and preferably having their edges notched or serrated, as illustrated. The action of these devices is obvious and will be described only briefly. The teeth of the chain C protrude horizontally into the cut grain as it leans against the standing conveyer, and thus engage and carry it positively toward the stubble end.

The advantage of separating the lowest carrying-chain from the others and actuating it separately arises from the fact that it is desirable that this lowest chain should have its grain-carrying teeth quite long, so as to reach through the entire mass of grain standing on the ledge, and thus grasp and move it positively by force applied near the butt-end, which is retarded by the friction of the stationary ledge on which it rests and over which it is advanced. If the roller A² were extended down to the plank A and the lowest chain carried by it were armed with the long teeth, these teeth, owing to the inclination of the roller, would move downward as they passed around the roller at the stubble end of the course of the chain, and in such motion they would have a tendency to break the straw engaged by them, or tip it backward as it left the conveyer, and so impede its progress to the binder in the rear, or prevent it from being delivered upright thereinto. This disadvantage is avoided by making the lowest chain, which has the long butt-engaging teeth, run in a horizontal plane, as described.

The grain carried by the endless conveyer is thus lodged standing on the plate E, but with a slight inclination backward—the inclination of the conveyer A'. As the plate E is reciprocated its lips E⁴ in the forward movement slip under the butts of the standing grain, and in the rearward movement engage and carry it rearward, thus with each reciprocation advancing it a short stage toward the binder. The speed of this movement should be sufficient to counteract the tendency of the leaning grain to fall toward the rear, and thus the grain will be retained in an upright position while being put within reach of the packers.

A modified form of this device is shown in Fig. 2, the plate E being actuated rearward by the engagement of the studs $f$ on the face of the gear-wheel B with the tooth $e'$ on the inner edge of the plate E, and being retracted forward by the spring $e^3$, secured to the plate and to the plank A. The instantaneous action of the spring $e^3$ in retracting the plate facilitates the ratchet action of the lips or ribs E⁴ on the grain, causing them to slip under the butts of the grain with less tendency to drag or carry the grain with the plate in the return movement.

I claim—

1. In combination with the leaning conveyer and the grain-supporting ledge, the horizontal butt-actuating chain having its teeth protruded horizontally over the ledge below the leaning conveyer, substantially as and for the purpose set forth.

2. In combination with the horizontal gear-wheel B, having the bevel gear-rim B' and the web B³ encircling it and terminating in the horizontal sprocket-rim B⁴, the leaning roller A² and its bevel gear-wheel driven by the bevel gear-rim B', the endless conveyers carried by the leaning roller, and the endless butt-actuating chain carried by the horizontal sprocket-rim, substantially as set forth.

3. The horizontal grain-supporting ledge and the standing-grain conveyer in the rear thereof, in combination with the ratchet-ribbed horizontally-reciprocating plate at the delivery end of the conveyer, near the level of the ledge, substantially as and for the purpose set forth.

4. The horizontal grain-supporting ledge, the leaning conveyer in the rear thereof, and the horizontal butt-actuating chain below the leaning conveyer and having its carrying-teeth protruded horizontally over the ledge, in combination with the ratchet-ribbed horizontally-reciprocating plate at the delivery end of the conveyer and butt-carrying chain, near the level of the ledge, substantially as and for the purpose set forth.

5. The standing conveyer, the train of horizontal gear-wheels which drive its carrying mechanism, the reciprocating butt-carrying plate which overlies said horizontal gears, and the pitman pivoted to the upper surface of one of the horizontal gears and to the lower surface of the plate, substantially as and for the purpose set forth.

6. The standing conveyer, the train of horizontal gears which drives it, the base plank or ledge which supports said conveyer and train, and the butt-carrying plate overlying said gears and pivoted to the plank and reciprocated by connection with one of the gears, substantially as and for the purpose set forth.

In testimony whereof I have hereunto set my hand, in the presence of two witnesses, at Chicago, Illinois, this 19th day of September, A. D. 1885.

THOMAS O. PERRY.

Witnesses:
FRANCIS W. PARKER,
CHAS. S. BURTON.